(12) United States Patent
Moriguchi et al.

(10) Patent No.: US 10,950,045 B2
(45) Date of Patent: Mar. 16, 2021

(54) VIRTUAL REALITY IMAGE DISPLAY SYSTEM AND VIRTUAL REALITY IMAGE DISPLAY METHOD FOR DISPLAYING A VIRTUAL REALITY IMAGE IN ACCORDANCE WITH A SENSED MOTION

(71) Applicant: NEC Solution Innovators, Ltd., Tokyo (JP)

(72) Inventors: Masakazu Moriguchi, Tokyo (JP); Yusuke Nakao, Tokyo (JP); Yoshie Sakurazawa, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 174 days.

(21) Appl. No.: 16/308,885

(22) PCT Filed: Jan. 16, 2017

(86) PCT No.: PCT/JP2017/001278
§ 371 (c)(1),
(2) Date: Dec. 11, 2018

(87) PCT Pub. No.: WO2017/216992
PCT Pub. Date: Dec. 21, 2017

(65) Prior Publication Data
US 2020/0312024 A1     Oct. 1, 2020

(30) Foreign Application Priority Data
Jun. 17, 2016    (JP) .............................. JP2016-121107

(51) Int. Cl.
*G06T 19/00*     (2011.01)
*G06F 3/01*      (2006.01)
*G06F 3/16*      (2006.01)

(52) U.S. Cl.
CPC .............. *G06T 19/00* (2013.01); *G06F 3/011* (2013.01); *G06F 3/165* (2013.01)

(58) Field of Classification Search
None
See application file for complete search history.

(56) References Cited

U.S. PATENT DOCUMENTS

| 5,999,185 A | * | 12/1999 | Kato | ................... | G06F 3/011 |
| | | | | | 345/420 |
| 2017/0031439 A1* | | 2/2017 | Connor | ................... | G06F 3/011 |

FOREIGN PATENT DOCUMENTS

| JP | H05-282279 A | 10/1993 |
| JP | H10-340039 A | 12/1998 |

OTHER PUBLICATIONS

International Search Report for PCT Application No. PCT/JP2017/001278, dated Mar. 21, 2017.

* cited by examiner

*Primary Examiner* — Vu Nguyen (57) ABSTRACT

A virtual reality image display system includes processor selects an attribute, senses motion of a user, generates a virtual reality image from body image information of the selected attribute, and controls motion of the generated virtual reality image based on information on the sensed motion of the user and displays the virtual reality image in accordance with the controlled motion.

11 Claims, 2 Drawing Sheets

VIRTUAL REALITY IMAGE DISPLAY SYSTEM AND VIRTUAL REALITY IMAGE DISPLAY METHOD FOR DISPLAYING A VIRTUAL REALITY IMAGE IN ACCORDANCE WITH A SENSED MOTION

This application is a National Stage Entry of PCT/JP2017/001278 filed on Jan. 16, 2017, which claims priority from Japanese Patent Application 2016-121107 filed on Jun. 17, 2016, the contents of all of which are incorporated herein by reference, in their entirety.

TECHNICAL FIELD

The present invention relates to a virtual reality image display system and a virtual reality image display method.

BACKGROUND ART

In recent years, a virtual reality (hereinafter, also referred to as VR) system that allows a user to have a pseudo experience in a virtual space by displaying an image linked to the motion of the user in a visualized virtual space has been actively developed. In the VR system, when the user wears a goggle with a sensor, the virtual space is usually displayed on the monitor of the goggle, and the sensor senses the motion of the user to display an image corresponding to the motion of the user in the virtual space.

SUMMARY OF INVENTION

Technical Problem

However, according to the conventional VR system, the images displayed in the virtual space are images of the same design, and the motion of the images is directly linked to the user's own motion, so that the user can only have a pseudo experience in the virtual space based on the user's own original feeling.

Hence, the present invention is intended to provide a VR image display system that allows a user to have a pseudo experience in a virtual space on the basis of senses of attributes different from those of the user himself/herself.

Solution to Problem

In order to achieve the aforementioned object, the first VR image display system of the present invention includes: a storage unit configured to store at least one attribute and body image information of each attribute; a selection unit configured to select an attribute from the at least one attribute; a sensing unit configured to sense motion of a user; a generation unit configured to generate a virtual reality image from the body image information of the selected attribute; a control unit configured to control motion of the generated virtual reality image on the basis of information on the sensed motion of the user; and a display unit configured to display the controlled virtual reality image.

The second VR image display system of the present invention includes: a storage unit configured to store at least one attribute, body image information, and body function information of each attribute; a selection unit configured to select an attribute from the at least one attribute; a sensing unit configured to sense motion of a user; a correction unit configured to correct information on the sensed motion of the user on the basis of body function information of the selected attribute; a generation unit configured to generate a virtual reality image from the body image information; a control unit configured to control motion of the generated virtual reality image on the basis of the corrected information on the sensed motion of the user; and a display unit configured to display the controlled virtual reality image.

The third VR image display system of the present invention includes: a storage unit configured to store at least one attribute, body image information of each attribute, body function information associated with the body image; a selection unit configured to select an attribute from the at least one attribute; a sensing unit configured to sense motion of a user; a correction unit configured to correct information on the sensed motion of the user on the basis of body function information of the selected attribute; a generation unit configured to generate a virtual reality image from body image information of the selected attribute on the basis of the corrected information on the sensed motion of the user; a control unit configured to control motion of the generated virtual reality image on the basis of the corrected information on the sensed motion of the user; and a display unit configured to display the controlled virtual reality image.

The first VR image display method of the present invention includes the steps of: selecting an attribute; sensing motion of a user; generating a virtual reality image from body image information of the selected attribute; controlling motion of the generated virtual reality image on the basis of information on the sensed motion of the user; and displaying the displaying the controlled virtual reality image.

The second VR image display method of the present invention includes the steps of: selecting an attribute; sensing motion of a user; correcting information on the sensed motion of the user on the basis of body function information of the selected attribute; generating a virtual reality image from body image information; controlling motion of the generated virtual reality image on the basis of the corrected information on the sensed motion of the user; and displaying the controlled virtual reality image.

The third VR image display method of the present invention includes the steps of: selecting an attribute; sensing motion of a user; correcting information on the sensed motion of the user on the basis of body function information of the selected attribute; generating a virtual reality image from body image information of the selected attribute on the basis of the corrected information on the sensed motion of the user; controlling motion of the generated virtual reality image on the basis of the corrected information on the sensed motion of the user; and displaying the controlled VR image.

The program of the present invention is configured to execute the VR image display method of the present invention.

The computer-readable recording medium of the present invention records the program of the present invention.

Advantageous Effects of Invention

The present invention allows a user to have a pseudo experience in a virtual space on the basis of senses of attributes different from those of the user himself/herself.

DESCRIPTION OF EXEMPLARY EMBODIMENTS

In the VR image display system of the present invention, the attribute is, for example, at least one selected from the group consisting of age, sex, height, the presence or absence of disorder, and type of disorder.

In the VR image display system of the present invention, the body function information is, for example, information on at least one selected from the group consisting of speed of motion, range of motion, physical strength, hearing, and visual acuity.

The VR image display system of the present invention further includes, for example, an audio output unit configured to output sound on the basis of information on hearing of the selected attribute.

In the VR image display method of the present invention, the attribute is, for example, at least one selected from the group consisting of age, sex, height, the presence or absence of disorder, and type of disorder.

In the VR image display method of the present invention, the body function information is, for example, information on at least one selected from the group consisting of speed of motion, range of motion, and physical strength.

Figure 1:
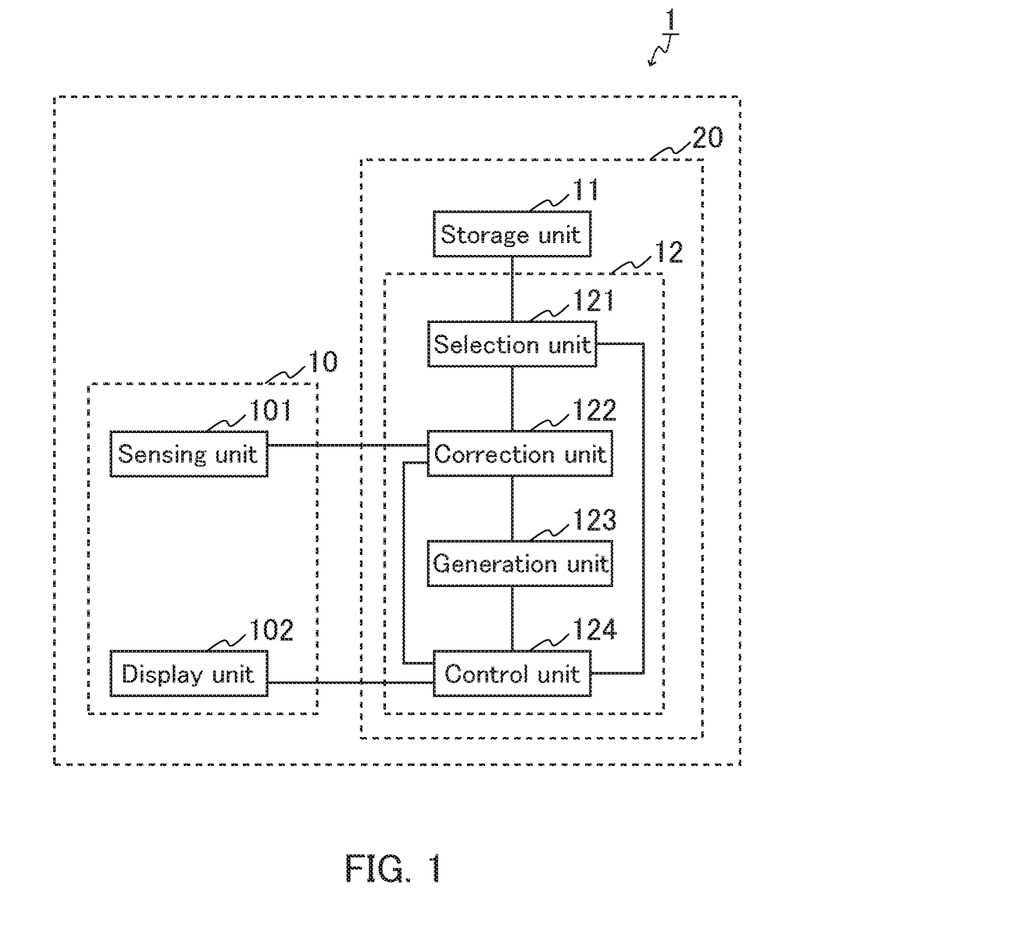
FIG. 1 is a block diagram showing an example VR image display system according to the second and third embodiments.
Figure 2:
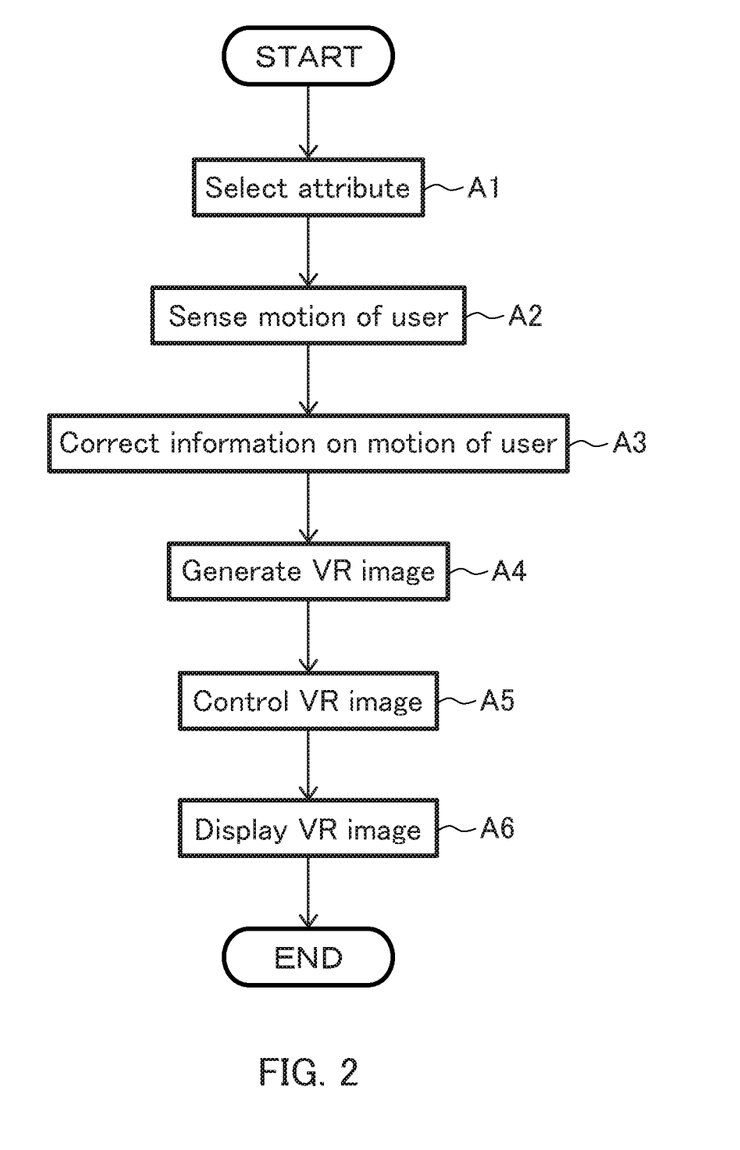
FIG. 2 is a flowchart of the VR image display method according to the second and third embodiments.

The VR image display method of the present invention further includes, for example, the step of outputting sound, and in the step of outputting sound, sound is output on the basis of information on hearing of the selected attribute The following describes embodiments of the present invention. The present invention, however, is by no means limited thereto. In FIGS. 1 and 2, the identical parts are denoted by identical reference numerals. Each embodiment can be described with reference to the description of the other embodiments, unless otherwise mentioned. The configuration of each embodiment can be combined with configurations of the other embodiments, unless otherwise mentioned. Generation of a VR image based on body image information of a selected attribute, control of motion of the VR image based on body function information of the selected attribute are based on an attribute(s) different from that of the user and are thus also referred to as "application of persona".

First Embodiment

First Embodiment relates to a first VR image display system and a first VR image display method of the present invention.

The VR image display system according to the present embodiment includes a storage unit, a selection unit, a generation unit, a control unit, a sensing unit, and a display unit.

For example, the VR image display system may be mounted on a device (e.g., a VR image display device) by integrating all of the units or may be separated from the device by any of the units. As a specific example, the VR image display system includes: a main body including a storage unit, a selection unit, a generation unit, and a control unit; and a terminal, which are electrically connected to each other. In the VR image display system, the terminal and the main body may be connected to each other via a communication network, for example.

The sensing unit and the display unit may be integrated into the terminal, for example. The terminal is, for example, wearable by a user, and examples thereof include a head mounted display and a VR goggle. In the terminal, the sensing unit is, for example, a motion sensor. The terminal may further include an audio output unit such as a speaker.

The storage unit and a data processing unit may be integrated into the main body, for example. The selection unit, the generation unit, and the control unit may be integrated into the data processing unit which is, for example, hardware or may be software or hardware into which the software has been incorporated. The data processing unit may include a central processing unit (CPU).

In the VR image display system, the storage unit is electrically connected to the selection unit, the selection unit is electrically connected to the generation unit, the control unit is electrically connected to the generation unit and the sensing unit, and the display unit is electrically connected to the control unit.

A VR image displayed by the VR image display system is, for example, a VR image of body displayed in a virtual space and is specifically a VR image of body which is supposed to be visible from the user's eyes.

The storage unit stores an attribute(s) and body image information of each attribute. Examples of the storage unit include a random-access memory (RAM), a read-only memory (ROM), a flash memory, a hard disc (HD), an optical disc, and a floppy (registered trademark) disc (FD). The storage unit may be, for example, an internal storage unit or an external storage unit such as an external storage device.

A subject for the attribute(s) is, for example, human. The attribute(s) is, for example, at least one selected from the group consisting of age, sex, height, the presence or absence of disorder, and type of disorder. The age may be, for example, classification of specific age groups or classification of categories such as the infants, the children, the adults, and the elderly. The sex is, for example, male or female. The height may be, for example, classification by specific numerical values or classification by numerical ranges. The disorder is not limited to particular disorders and can be, for example, a disorder of lower half of body or upper half of body.

The body image information of each attribute is body image information of each attribute. The body image information may be, for example, a body image itself or information for generating a body image. A target body is not limited to particular bodies and can be, for example, its own body part that can be visually recognized by a human being in his/her own field of view, and specific examples thereof include: body parts of the upper half of the body such as hands, arms, shoulders, a chest, a stomach; and body parts of the lower half of the body such as legs.

The sensing unit senses motion of a user. The sensing unit can be, for example, a sensor such as a motion sensor. When a user wears the terminal such as a head mounted display, a sensor in the terminal senses the motion of the user wearing the terminal.

The number of attributes stored in a storage unit is not limited to particular numbers and may be 1 and is preferably 2 or more. In the VR image display system, a VR image corresponding to the attribute selected by the user can be displayed as mentioned below. Thus, storing a plurality of VR images allows, for example, setting of various VR images.

By the selection unit, an attribute of a VR image to be generated is selected. Specifically, an attribute of a VR image to be generated is selected among an attribute(s) stored in the storage unit. The selection unit can be, for example, CPU. In the VR image display system, the main body may further include, for example, a display unit and an input unit. In this case, the display unit may display an attribute(s) stored in the storage unit, and with the input unit, the selected attribute may be input. The display unit can be, for example, a monitor such as a touch panel, and examples of the input unit include a keyboard, a mouse, and a touch panel.

The generation unit generates a VR image from body image information of the selected attribute. The generation unit can be, for example, CPU.

The control unit controls motion of the generated VR image on the basis of information on the sensed motion of the user. The control unit can be, for example, CPU.

The display unit displays the controlled VR image. The display unit can be, for example, a display such as a head mounted display.

Next, the following shows a flowchart of the VR image display method according to the present embodiment. The VR image display method according to the present embodiment is performed, for example, as follows using the VR image display system according to the present embodiment. The VR image display method according to the present embodiment includes a step A1 (selection of attribute), a step A2 (sensing of motion of user), a step A3 (generation of VR image), a step A4 (control of VR image), and a step A5 (display of VR image). The step A1, the step A2, the step A3, the step A4, and the step A5 of the VR image display method according to the present embodiment are performed in this order, and in the first VR image display method of the present invention, the order of performing these steps is not limited to this order, and the steps A2 to A5 may be performed in parallel, for example.

(A1) Selection of attribute In the step A1, an attribute is selected among an attribute(s) stored in the storage unit. Body image body image information of the selected attribute is acquired by the selection of the attribute.

(A2) Sensing of motion of user In the step A2, motion of the user is sensed. In the step A2, for example, when the user wears a terminal including the sensing unit, the sensing unit senses motion of the user and acquires information on the motion of the user.

(A3) Generation of VR image In the step A3, the generation unit generates a VR image from body image information of the selected attribute.

(A4) Control of VR image In the step A4, motion of the generated VR image is controlled on the basis of information on the sensed motion of the user.

(A5) Display of VR image In the step A5, the controlled VR image is displayed. The steps (A2) to (A5) are then repeatedly performed while the user is moving, and the process ends.

The following describes the VR image display system and the VR image display method according to the present embodiment by taking an example where the user is an adult and selects the children as an attribute. The present invention, however, is by no means limited thereto.

In the step A1, a child is selected as an attribute. Body image information of the child is acquired by this selection. The body image information is, for example, information for generating a VR image and is specifically, for example, information of small hands and small feet of the child.

Next, in the step A2, motion of the adult user is sensed. The adult user moves while wearing a terminal such as a head mounted display with a sensor, as mentioned above, for example.

Then, in the step A3, a VR image is generated from body image information of the selected child. In this case, for example, a VR image of small hands is generated from the body image information of the child.

Further, in the step A4, motion of the generated VR image is controlled on the basis of information on the motion of the adult user.

In the step A5, the controlled VR image is displayed. That is, an image of a body of the child, which is different from the actual adult user is displayed.

As described above, in the VR image display system of the present invention, a VR image displayed in a virtual space is a body image of a small child, which is different from a body image recognized by the user himself/herself even when an actual user is an adult, for example. Thus, the user can have a pseudo experience of the body of a different attribute from the user himself/herself in a virtual space.

Second Embodiment

The second embodiment relates to a second VR image display system and a second VR image display method of the present invention.

FIG. 1 is a block diagram showing the VR image display system according to the present embodiment. As shown in FIG. 1, the VR image display system 1 according to the present embodiment includes a storage unit 11, a selection unit 121, a correction unit 122, a generation unit 123, a control unit 124, a sensing unit 101, and a display unit 102.

For example, the VR image display system 1 may be mounted on a device (e.g., also referred to as a VR image display device) by integrating all of the units or may be separated from the device by any of the units. FIG. 1 shows an example configuration where a terminal 10 and a main body 20 including the storage unit 11, the selection unit 121, the correction unit 122, the generation unit 123, and the control unit 124 are electrically connected to each other. In the VR image display system 1, the terminal 10 and the main body 20 may be connected to each other via a communication network, for example.

The sensing unit 101 and the display unit 102 may be integrated into the terminal 10, for example. The terminal 10 is, for example, wearable by a user, and examples thereof include a head mounted display and a VR goggle. In the terminal 10, the sensing unit 101 is, for example, a motion sensor. The terminal 10 may further include an audio output unit such as a speaker.

The storage unit 11 and a data processing unit 12 may be integrated into the main body 20, for example. The selection unit 121, the correction unit 122, the generation unit 123, and the control unit 124 may be integrated into the data processing unit 12 which is, for example, hardware or may be software or hardware into which the software has been incorporated. The data processing unit 12 may include a central processing unit (CPU).

In the VR image display system 1, the storage unit 11 is electrically connected to the selection unit 121, the correction unit 122 is electrically connected to the selection unit 121, the sensing unit 101, the generation unit 123, and the control unit 124, the generation unit 123 is electrically connected to the control unit 124, and the display unit 102 is electrically connected to the control unit 124.

A VR image displayed by the VR image display system 1 is, for example, a VR image of body displayed in a virtual space and is specifically a VR image of body which is supposed to be visible from the user's eyes.

The storage unit 11 stores attribute(s), body image information, and body function information of each attribute. Examples of the storage unit 11 include a random-access memory (RAM), a read-only memory (ROM), a flash memory, a hard disc (HD), an optical disc, and a floppy (registered trademark) disc (FD). The storage unit 11 may be, for example, an internal storage unit or an external storage unit such as an external storage device.

A subject for the attribute(s) is, for example, human. The attribute(s) is, for example, at least one selected from the group consisting of age, sex, height, the presence or absence of disorder, and type of disorder. The age may be, for example, classification of specific age groups or classification of categories such as the infants, the children, the adults, and the elderly. The sex is, for example, male or female. The height may be, for example, classification by specific numerical values or classification by numerical ranges. The disorder is not limited to particular disorders and can be, for example, a disorder of lower half of body or upper half of body.

The body image information may be, for example, a body image itself or information for generating a body image. A target body is not limited to particular bodies and can be, for example, its own body part that can be visually recognized by a human being in his/her own field of view, and specific examples thereof include: body parts of the upper half of the body such as hands, arms, shoulders, a chest, a stomach; and body parts of the lower half of the body such as legs.

The body function information of each attribute is body function information corresponding to each attribute. Examples of the body function information include speed of motion, range of motion, physical strength, hearing, and visual acuity.

A sensing unit 101 senses motion of the user. The sensing unit 101 can be, for example, a sensor such as a motion sensor. When a user wears a terminal 10 such as a head mounted display, a sensor in the terminal 10 senses the motion of the user wearing the terminal 10.

The number of attributes stored in a storage unit 11 is not limited to particular numbers and may be 1 and is preferably 2 or more. In the VR image display system 1, a VR image corresponding to the attribute selected by the user can be displayed as mentioned below. Thus, storing a plurality of VR images allows, for example, setting of various VR images.

By the selection unit 121, an attribute for setting motion of VR image to be generated is selected. Specifically, an attribute for setting motion of VR image to be generated is selected among an attribute(s) stored in the storage unit 11. The selection unit 121 can be, for example, CPU. In the VR image display system 1, the main body 20 may further include, for example, a display unit and an input unit. In this case, the display unit may display an attribute(s) stored in the storage unit 11, and with the input unit, the selected attribute may be input. The display unit can be, for example, a monitor such as a touch panel, and examples of the input unit include a keyboard, a mouse, and a touch panel.

The correction unit 122 corrects, on the basis of body function information of the selected attribute, information on the motion of the user sensed with the sensing unit 101. The correction unit 122 can be, for example, CPU.

The generation unit 123 generates a VR image from the body image information. The generation unit 123 can be, for example, CPU.

The control unit 124 controls motion of the generated VR image on the basis of the corrected information on the sensed motion of the user. The control unit 124 can be, for example, CPU.

The display unit 102 displays the controlled VR image. The display unit 102 can be, for example, a display such as a head mounted display.

FIG. 2 shows a flowchart of the VR image display method according to the present embodiment. The VR image display method according to the present embodiment is performed, for example, as follows using the VR image display system shown in FIG. 1. The VR image display method according to the present embodiment includes a step A1 (selection of attribute), a step A2 (sensing of motion of user), a step A3 (correction of information on motion of user), a step A4 (generation of VR image), a step A5 (control of VR image), and a step A6 (display of VR image). The step A1, the step A2, the step A3, the step A4, the step A5, and the step A6 of the VR image display method according to the present embodiment are performed in this order, and in the VR image display method of the present invention, the order of performing these steps is not limited to this order, and the steps A2 to A6 may be performed in parallel, for example.

(A1) Selection of attribute In the step A1, an attribute is selected among an attribute(s) stored in the storage unit. Body function information of the selected attribute is acquired by the selection of the attribute.

(A2) Sensing of motion of user In the step A2, motion of the user is sensed. In the step A2, for example, when the user wears a terminal including the sensing unit, the sensing unit senses motion of the user and acquires information on the motion of the user.

(A3) Correction of information on motion of user In the step A3, information on the sensed motion of the user is corrected on the basis of the body function information of the selected attribute.

(A4) Generation of VR image In the step A4, a VR image is generated on the basis of the body image information stored in the storage unit.

(A5) Control of VR image In the step A5, motion of the generated VR image is controlled on the basis of the corrected information on the sensed motion of the user.

(A6) Display of VR image In the step A6, the controlled VR image is displayed. The steps (A2) to (A6) are then repeatedly performed while the user is moving, and the process ends.

The following describes the VR image display system and the VR image display method according to the present embodiment by taking an example where the user is a male and selects the females as an attribute. The present invention, however, is by no means limited thereto.

In the step A1, a female is selected as an attribute. Body function information of the female is acquired by this selection. The body function information is, for example, information of weaker strength.

Next, in the step A2, motion of the male user is sensed. The adult user moves while wearing a terminal such as a head mounted display with a sensor, as mentioned above, for example.

Then, in the step A3, information on the sensed motion of the male user is corrected on the basis of the body function information of the selected females. In this case, the information on the actual motion of the male user is compared with the body function information of the female, and for example, information that the male user has strong strength is corrected to information of weak strength on the basis of the body function information that the female has weak strength.

Next, in the step A4, a VR image is generated from the body image information.

Further, in the step A5, motion of the generated VR image is controlled on the basis of the corrected information on the sensed motion of the male user. In this case, the actual motion of the male user has strong strength, but the motion of the generated VR image is controlled to have weak strength, which is different from the actual motion of the male user because the information on the sensed motion of the male user is corrected to information of weak strength on the basis of the body function information of the selected female.

Then, in the step A6, the controlled VR image is displayed. That is, a VR image of motion of body with weak strength, which is different from the actual motion of the male user is displayed. As a specific example, even when the male user moves to carry a heavy load, an image of the motion that the male user cannot carry the load is displayed in a virtual space.

As described above, in the VR image display system of the present invention, a VR image displayed in a virtual space is an image of motion with weak strength, which is different from the actual motion of the male user even when an actual user is a male and actually moves with strong strength, for example. Thus, the user can have a pseudo experience of the body with a body function of different attributes from the user himself/herself in a virtual space.

Third Embodiment

The third embodiment relates to a third VR image display system and a third VR image display method of the present invention.

The VR image display system according to the present embodiment can be shown in the block diagram of FIG. 1 as in the second embodiment. As shown in FIG. 1, the VR image display system 1 according to the present embodiment includes a storage unit 11, a selection unit 121, a correction unit 122, a generation unit 123, a control unit 124, a sensing unit 101, and a display unit 102.

For example, the VR image display system 1 may be mounted on a device (e.g., also referred to as a VR image display device) by integrating all of the units or may be separated from the device by any of the units. FIG. 1 shows an example configuration where a terminal 10 and a main body 20 including the storage unit 11, the selection unit 121, the correction unit 122, the generation unit 123, and the control unit 124 are electrically connected to each other. In the VR image display system 1, the terminal 10 and the main body 20 may be connected to each other via a communication network, for example.

The sensing unit 101 and the display unit 102 may be integrated into the terminal 10, for example. The terminal 10 is, for example, wearable by a user, and examples thereof include a head mounted display and a VR goggle. In the terminal 10, the sensing unit 101 is, for example, a motion sensor. The terminal 10 may further include an audio output unit such as a speaker.

The storage unit 11 and a data processing unit 12 may be integrated into the main body 20, for example. The selection unit 121, the correction unit 122, the generation unit 123, and the control unit 124 may be integrated into the data processing unit 12 which is, for example, hardware or may be software or hardware into which the software has been incorporated. The data processing unit 12 may include a central processing unit (CPU).

In the VR image display system 1, the storage unit 11 is electrically connected to the selection unit 121, the correction unit 122 is electrically connected to the selection unit 121, the sensing unit 101, the generation unit 123, and the control unit 124, the generation unit 123 is electrically connected to the control unit 124, and the display unit 102 is electrically connected to the control unit 124.

A VR image displayed by the VR image display system 1 is, for example, a VR image of body displayed in a virtual space and is specifically a VR image of body which is supposed to be visible from the user's eyes.

The storage unit 11 stores an attribute(s), body image information of each attribute, and a body function information associated with the body image. Examples of the storage unit 11 include a random-access memory (RAM), a read-only memory (ROM), a flash memory, a hard disc (HD), an optical disc, and a floppy (registered trademark) disc (FD). The storage unit 11 may be, for example, an internal storage unit or an external storage unit such as an external storage device.

A subject for the attribute(s) is, for example, human. The attribute(s) is, for example, at least one selected from the group consisting of age, sex, height, the presence or absence of disorder, and type of disorder. The age may be, for example, classification of specific age groups or classification of categories such as the infants, the children, the adults, and the elderly. The sex is, for example, male or female. The height may be, for example, classification by specific numerical values or classification by numerical ranges. The disorder is not limited to particular disorders and can be, for example, a disorder of lower half of body or upper half of body.

The body image information of each attribute is body image information of each attribute. The body image information may be, for example, a body image itself or information for generating a body image. A target body is not limited to particular bodies and can be, for example, its own body part that can be visually recognized by a human being in his/her own field of view, and specific examples thereof include: body parts of the upper half of the body such as hands, arms, shoulders, a chest, a stomach; and body parts of the lower half of the body such as legs.

Examples of the body function information include speed of motion, range of motion, physical strength, hearing, and visual acuity.

A sensing unit 101 senses motion of the user. The sensing unit 101 can be, for example, a sensor such as a motion sensor. When a user wears a terminal 10 such as a head mounted display, a sensor in the terminal 10 senses the motion of the user wearing the terminal 10.

The number of attributes stored in a storage unit 11 is not limited to particular numbers and may be 1 and is preferably 2 or more. In the VR image display system 1, a VR image corresponding to the attribute selected by the user can be displayed as mentioned below. Thus, storing a plurality of VR images allows, for example, setting of various VR images.

By the selection unit 121, an attribute of a VR image to be generated is selected. Specifically, an attribute of a VR image to be generated is selected among an attribute(s) stored in the storage unit 11. The selection unit 121 can be, for example, CPU. In the VR image display system 1, the main body 20 may further include, for example, a display unit and an input unit. In this case, the display unit may display an attribute(s) stored in the storage unit, and with the input unit, the selected attribute may be input. The display unit can be, for example, a monitor such as a touch panel, and examples of the input unit include a keyboard, a mouse, and a touch panel.

The correction unit 122 corrects, on the basis of body function information of the selected attribute, information on the motion of the user sensed with the sensing unit 101. The correction unit 122 can be, for example, CPU.

The generation unit 123 generates a VR image from the body image information of the selected attribute on the basis of the corrected information on the sensed motion of the user. The generation unit 123 can be, for example, CPU.

The control unit 124 controls motion of the generated VR image on the basis of the corrected information on the sensed motion of the user. The control unit 124 can be, for example, CPU.

The display unit 102 displays the controlled VR image. The display unit 102 can be, for example, a display such as a head mounted display.

FIG. 2 shows a flowchart of the VR image display method according to the present embodiment as in the second embodiment, for example. The VR image display method according to the present embodiment is performed, for example, as follows using the VR image display system shown in FIG. 1. The VR image display method according to the present embodiment includes a step A1 (selection of attribute), a step A2 (sensing of motion of user), a step A3 (correction of information on motion of user), a step A4 (generation of VR image), a step A5 (control of VR image), and a step A6 (display of VR image). The step A1, the step A2, the step A3, the step A4, the step A5, and the step A6 of the VR image display method according to the present embodiment are performed in this order, and in the VR image display method of the present invention, the order of performing these steps is not limited to this order, and the steps A2 to A6 may be performed in parallel, for example.

(A1) Selection of attribute In the step A1, an attribute is selected among an attribute(s) stored in the storage unit. Body image body image information of the selected attribute and body function information associated with the body image are acquired by the selection of the attribute.

(A2) Sensing of motion of user In the step A2, motion of the user is sensed. In the step A2, for example, when the user wears a terminal including the sensing unit, the sensing unit senses motion of the user and acquires information on the motion of the user.

(A3) Correction of information on motion of user In the step A3, information on the sensed motion of the user is corrected on the basis of the body function information of the selected attribute.

(A4) Generation of VR image In the step A4, a VR image is generated from the body image information of the selected attribute on the basis of the corrected information on the sensed motion of the user.

(A5) Control of VR image In the step A5, motion of the generated VR image is controlled on the basis of the corrected information on the sensed motion of the user.

(A6) Display of VR image In the step A6, the controlled VR image is displayed. The steps (A2) to (A6) are then repeatedly performed while the user is moving, and the process ends.

The following describes the VR image display system and the VR image display method according to the present embodiment by taking an example where the user is a young person and selects the elderly as an attribute. The present invention, however, is by no means limited thereto.

In the step A1, the elderly is selected as an attribute. Body image information of the elderly and the body function information of the elderly are acquired by this selection. The body image information is, for example, information for generating a VR image and is specifically, for example, information of wrinkled hands due to aging and bent feed due to aging. The body function information is, for example, information that motion is slow, the back is stooped and cannot be straightened, knees are bent and cannot be straightened, legs cannot be raised, arms cannot be raised, a body cannot be twisted, and the head cannot be raised.

Next, in the step A2, motion of the young user is sensed. The young user moves while wearing a terminal such as a head mounted display with a sensor, as mentioned above, for example.

Then, in the step A3, information on the sensed motion of the young user is corrected on the basis of the body function information of the selected elderly. In this case, the information on the actual motion of the young user is compared with the body function information of the elderly, and for example, information that the young user moves is fast to information of slow motion on the basis of the body function information that the motion in the elderly is slow.

Next, in the step A4, a VR image is generated from the body image information of the selected elderly on the basis of the corrected information on the sensed motion of the young user. In this case, for example, a VR image of wrinkled hands due to aging is generated from the body image information of the elderly.

Further, in the step A5, motion of the generated VR image is controlled on the basis of the corrected information on the sensed motion of the young user. In this case, the actual motion of the young user is fast, but the motion of the generated VR image is controlled to be slow, which is different from the actual motion of the young user because the information on the sensed motion of the young user is corrected to information of slow motion on the basis of the body function information of the selected elderly.

Then, in the step A6, the controlled VR image is displayed. That is, a VR image of slow motion of body, which is different from the actual motion of the young user is displayed.

As described above, in the VR image display system of the present invention, a VR image displayed in a virtual space is an image of heavily slow motion, which is different from the actual motion of the young user even when an actual user is young and actually moves handily, for example. Thus, the user can have a pseudo experience of the body with a body function of different attributes from the user himself/herself in a virtual space.

In the VR image display system of the present invention, a user can have a pseudo experience in a virtual space on the basis of senses of attributes different from those of the user himself/herself. Thus, for example, the present invention can be used in structural check for structures such as barrier-free structures.

Barrier-free design is important for ensuring safety for the elderly, disabled persons, and infants. However, in construction based on design, it may be difficult to judge whether the structure is actually suitable for the subject because of the difference in body function between the subject and the designer. In this case, in the VR image display system of the present invention, a designed barrier-free room is displayed as a virtual space, a user selects a relevant attribute corresponding to the subject (e.g., the elderly) and moves through the virtual space by the body function corresponding to the attribute of the subject, which is different from that of the user, to check whether the design is suitable for the subject. For example, as to a step designed to satisfy the barrier-free conditions, the user himself/herself lifts his/her leg to the height at which the user can climb the step on the basis of his/her body function. However, in the VR image display system of the present invention, the information on the actual motion is corrected on the basis of the body function information of the attribute. Thus, the generated VR image of the lifted leg is displayed in the state where the lifted leg does not reach the height of actually lifted leg, and the user cannot climb the step. In order to climb the step, the user is required to lift his/her leg higher, and a higher physical load than that required for the user to climb the step in the real world is thus applied to the user. From this pseudo experience, the user can understand that the designed step causes a higher physical load than the user feels by himself/herself to be applied to the subject, and more suitable barrier-free design can be made. Moreover, before actual construction, the detailed check of the design can be performed by the pseudo experience. Thus, changes and repairs after the construction can be reduced.

Examples of the structure include houses, offices, stores, factories, laboratories, stations, airports, and accommodations such as hotels. Moreover, examples of the item to be checked include barrier free and circulation.

For example, the case where the attribute is the "elderly", and the body function information of the attribute is "function information that hands move slowly" can be taken as an example. In this case, when the user is a young person, an image to be displayed in a virtual space is an image where the user can only move his/her hands slowly, which differs from actual movement although the user actually can move his/her hands handily. Thus, the user feels a sense of incongruity. On the other hand, when the user follows the motion of the VR image in a virtual space by actually moving slowly, the user can be free from the sense of incongruity. As described above, the user is caused to feel a sense of incongruity by an image in a virtual space and then actually moves to match the motion in a virtual space, so that the user can have a pseudo experience of the senses of the selected attribute.

For example, the case where the attribute is a "child", the body image information of the attribute is "image information of small hands", and the body function information of the attribute is "function information that it is difficult to grab an object because of the small hands" can be taken as an example. In this case, when the user is an adult, the user can have a pseudo experience of the situation where the user cannot grab an object handily in a virtual space although the use actually can grab the object easily.

For example, the case where the attribute is "a person with a fracture", the body image information of the attribute is "image information of a leg in plaster because of the fracture", and the body function information of the attribute is "function information that it is difficult to take a step with the fractured leg" can be taken as an example. In this case, when the user is a healthy individual, the user can have a pseudo experience of the situation where the user cannot take steps with the leg in a virtual space although the user actually can take steps with his/her legs easily.

The VR image display system of the present invention may further include an alert output unit, for example. The alert output unit can output an alert, for example, when the actual motion of the user does not coincide with the motion of the VR image in a virtual space. This allows the user to feel a sense of incongruity. The alert can be, for example, a sound or an effect from the display unit.

Fourth Embodiment

The fourth embodiment is a modification of the first to third embodiments and further relates to a VR image display system of the present invention further including an audio output unit and a VR image display method of the present invention further including the step of outputting sound. The VR image display system and the VR image display method according to the present embodiment can be described, for example, with reference to the description of the VR image display systems and the VR image display methods according to the first to third embodiments.

The audio output unit output sound on the basis of information on hearing of the selected attribute. The audio output unit is, for example, incorporated into the terminal as in the sensing unit and the display unit. In the step of outputting sound, sound is output on the basis of information on hearing of the selected attribute.

As described above, by including the audio output unit or the step of outputting sound, sound is output on the basis of not actual hearing of the user but information on hearing of the selected attribute, and thus, the user can have a pseudo experience of not only vision but also hearing on the basis of the body function of the attribute that is different from that of the user.

Fifth Embodiment

The VR image display system and the VR image display method of the present invention can also be applied to the following embodiment, for example.

(1) Application of Persona (1-1) An Anthropometric Database is Included, and the Body Size can be Reproduced and Simulated.

In addition, by inputting an age group, the user can simulate a person with an average body size, a body size of the upper 95%, or a body size of the lower 95% in the input age group. Thus, whether there is any ergonomic problem can be efficiently checked.

When consideration is desired to be given to the field workers instead of the condition of a general body size in the race such as Japanese, for example, the anthropometric data collected by Kinect (registered trademark) are accumulated, and an average body size, a body size of the upper 95%, or a body size of the lower 95% can be set assuming the field workers.

(1-2) Experience of Pregnancy

Visual feedback, such as an increase of blind spots in a lower part of the field of view Display of hands reflecting loss of range of motion For example, the user's hands are unreachable because of his/her stomach sticking out.

Visualization of collision with stomach. For example, the user has forgot that his/her stomach is sticking out and then moved forward, so that he/she hit the desk with his/her stomach. For example, when the user passed a person coming from the other side, he/she turned sideways to step out of the person's way. However, he/she bumped into the person because his/her stomach is sticking out.

(1-3) Experience of Visual Field Defect

The user can experience people with partial visual field defects.

(1-4) Experience of Unilateral Deafness (1-5) Comparison of Experiences of the Above-Described Persona The user experience both normal hearing and unilateral deafness, and the time, movement, movement of the face (movement of the face thinking about where the sound comes from), and the amount of movement of hands are compared and displayed for each steps, for example, in a table.

Steps with large differences in time and amount of movement of the face and hands are displayed to be conspicuous by changing colors corresponding to the relevant steps in the table or displaying icons.

(1-6) Persona Simulation

After normal operation by healthy individuals, actions (e.g., hands are unreachable because of being short in height, stairs cannot be climbed up because of wheelchairs, characters on a button cannot be read because of lack of contrast) which cannot be performed by various personas (e.g., visual characteristics, hearing characteristics, motility characteristics, pregnancy, ostomate, wheelchairs, limb defects, children) in the operation are displayed so that the healthy individuals are made aware of inconveniences for people other than the healthy individuals. Thus, the present invention allows Universal Design (UD).

(2) Body Function Information of Attribute (2-1) Perception

Understanding people with cataract by blurring vision

Understanding people with deafness by causing sound to be unclear

Understanding people with blindness by impairing vision

Understanding people with severe deafness by muting or making monaural sound

Displaying what was invisible in the previous height setting in a noticeable manner when the height setting is changed Causing high sounds which cannot be normally hear to here when the age setting is the children.

(2-2) Awareness

Causing rules of thumb not to be used

For example, when there is a task of "looking at the signboard of the toilet and entering the male toilet", the icon color of the sex of the toilet is changed.

Whether people with different cultural interpretations of color correctly determine sex can be tested.

For example, an array of the keyboard is inverted, so that the user feels as if he/she uses a personal computer or a smartphone for the first time.

For example, important information is placed from right to left at information (e.g., advertising signs, signs) which is shown to the user.

(2-3) Memory

Creating a forcibly forgetting situation.

For example, when the task to be accomplished includes an operation of "reading a manual", whether the design can be suitable for the people who forget thinks a lot (for example, a design which does not rely on short-term memory) can be verified by skipping the task of reading the manual in the reproduction mode for people with dementia or people who forget thinks a lot.

Creating a forcibly mistaking situation.

For example, when the task to be accomplished includes an operation of "reading a manual", the contents of the manual are replaced.

(2-4) Movement

It is possible to cause the user to recognize only one hand assuming a one-armed person, or it is possible to switch between the left and right hands to be used for the first time by switching the load from one of the hands to the other assuming a person who carries the load with one hand.

When the user presses the bottom, the position of the bottom is slightly shifted from the position thought by the user to be the position of the bottom, assuming a person with twitching muscle of the arm. The display of his/her hand is also swayed.

Sixth Embodiment

The program according to the present embodiment executes the VR image display method of the present invention on computer. The program according to the present embodiment may be recorded on, for example, a computer-readable recording medium. The recording medium is not limited to particular media, and examples thereof include a random-access memory (RAM), a read-only memory (ROM), a, a hard disc (HD), an optical disc, and a floppy (registered trademark) disc (FD).

While the present invention has been described above with reference to exemplary embodiments and examples, the present invention is by no means limited thereto. Various changes and modifications that may become apparent to those skilled in the art may be made in the configuration and specifics of the present invention without departing from the scope of the present invention.

The present application claims priority from Japanese Patent Application No. 2016-121107 filed on Jun. 17, 2016, the entire disclosure of which is incorporated herein by reference.

INDUSTRIAL APPLICABILITY

The present invention allows a user to have a pseudo experience in a virtual space on the basis of senses of attributes different from those of the user himself/herself.

REFERENCE SIGNS LIST

1 VR image display system
10 terminal
101 sensing unit
102 display unit
20 main body
11 storage unit
12 data processing unit
121 selection unit
122 correction unit
123 generation unit
124 control unit

What is claimed is:

1. A virtual reality image display system comprising a storage, at least one processor and a display, wherein
the storage is configured to store at least one attribute and body image information of each of the at least one attribute;
the processor is configured to:
select an attribute from the at least one attribute,
sense motion of a user,
generate a virtual reality image from the body image information of the selected attribute,
control motion of the generated virtual reality image based on the sensed motion of the user, and
output an alert when the sensed motion of the user does not coincide with the motion of the virtual reality image in a virtual space; and
the display is configured to display the controlled virtual reality image.

2. The virtual reality image display system according to claim 1, wherein the at least one attribute is at least one selected from the group consisting of age, sex, height, the presence or absence of disorder, and type of disorder.

3. The virtual reality image display system according to claim 1, the processor is further configured to output sound on the basis of information on hearing of the selected attribute.

4. A virtual reality image display system comprising a storage, at least one processor and a display, wherein
the storage is configured to store at least one attribute, body image information, and body function information of each of the at least one attribute;
the processor is configured to:
select an attribute from the at least one attribute,
sense motion of a user,
correct information on the sensed motion of the user based on the body function information of the selected attribute,
generate a virtual reality image from the body image information,
control motion of the generated virtual reality image based on the corrected information on the sensed motion of the user, and
output an alert when the sensed motion of the user does not coincide with the motion of the virtual reality image in a virtual space; and
the display is configured to display the controlled virtual reality image.

5. The virtual reality image display system according to claim 4, wherein the at least one attribute is at least one selected from the group consisting of age, sex, height, the presence or absence of disorder, and type of disorder.

6. The virtual reality image display system according to claim 4, wherein the body function information is information on at least one selected from the group consisting of speed of motion, range of motion, physical strength, hearing, and visual acuity.

7. The virtual reality image display system according to claim 4, the processor is further configured to output sound on the basis of information on hearing of the selected attribute.

8. A virtual reality image display system comprising a storage, at least one processor and a display, wherein
the storage is configured to store at least one attribute, body image information of each of the at least one attribute, a body function information associated with the body image;
the processor is configured to:
select an attribute from the at least one attribute,
sense motion of a user,
correct information on the sensed motion of the user based on the body function information of the selected attribute,
generate a virtual reality image from the body image information of the selected attribute on the basis of the corrected information on the sensed motion of the user,
control motion of the generated virtual reality image based on the corrected information on the sensed motion of the user, and
output an alert when the sensed motion of the user does not coincide with the motion of the virtual reality image in a virtual space; and
the display is configured to display the controlled virtual reality image.

9. The virtual reality image display system according to claim 8, wherein the at least one attribute is at least one selected from the group consisting of age, sex, height, the presence or absence of disorder, and type of disorder.

10. The virtual reality image display system according to claim 8, wherein the body function information is information on at least one selected from the group consisting of speed of motion, range of motion, physical strength, hearing, and visual acuity.

11. The virtual reality image display system according to claim 8, the processor is further configured to output sound on the basis of information on hearing of the selected attribute.

\* \* \* \* \*